Dec. 30, 1930. S. H. H. PARSONS 1,786,741

DEMOUNTABLE SHEAVE BEARING

Filed July 27, 1929 2 Sheets-Sheet 1

INVENTOR.
Sylvanus H. H. Parsons.
BY
John J. Thompson
ATTORNEYS.

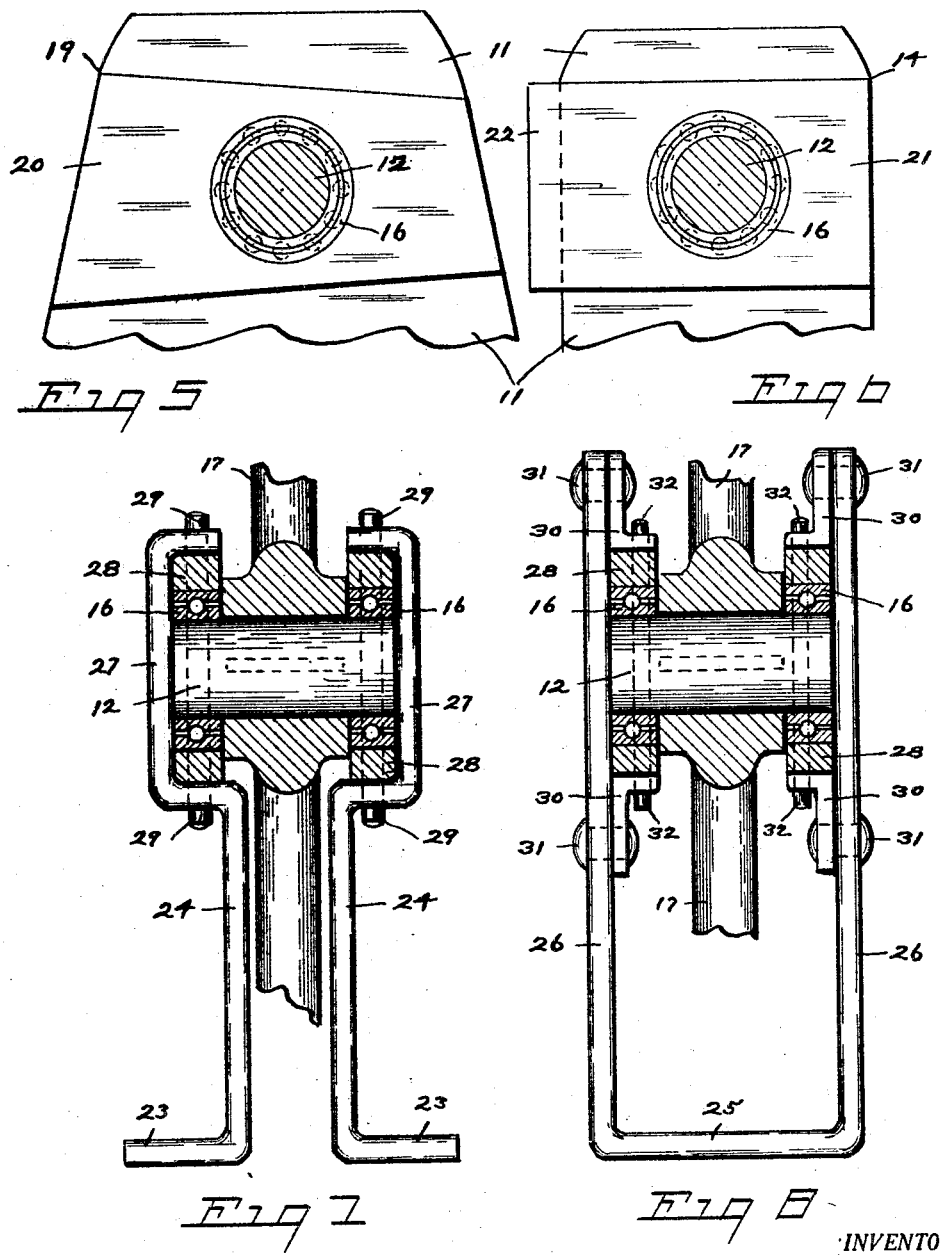

Patented Dec. 30, 1930

1,786,741

UNITED STATES PATENT OFFICE

SYLVANUS H. H. PARSONS, OF COSCOB, CONNECTICUT, ASSIGNOR TO JACOB RUPPERT SCHALK, OF POUGHKEEPSIE, NEW YORK

DEMOUNTABLE SHEAVE BEARING

Application filed July 27, 1929. Serial No. 381,544.

This invention relates to a demountable sheave bearing of that class where it is desirable to be able to remove both the sheave wheel and the pin or shaft on which it is mounted without having access to either side of the housing or block within which the sheave wheel is mounted, this being especially important in the use of sheave wheels for steering gears in marine work where the blocks have to be mounted between decks, against bulkheads etc., where it is impossible to gain access to either side of the block without demounting the same.

The object of the invention is to provide novel construction, whereby the bearing within which is mounted the shaft carrying the sheave wheel may be removed from the block without access to either side thereof.

Further, that the block may be mounted in a permanent manner with either or both of its sides in close proximity to a bulkhead or deck.

Still another object being that by this style of bearing the shaft may be made to float in ball or roller bearings which are removable as a unit for the purpose of removing the sheave or to renew the parts, and also by this construction shafts of different sizes may be interchanged in the same housing or block by the substitution of bearing blocks of different bores.

With these and other objects in view my invention consists in certain novel construction and combination of parts as will hereinafter be fully described and claimed, and fully illustrated in the accompanying drawings in which like figures of reference refer to corresponding parts in all of the views, but it is understood that slight changes may be made without departing from the spirit of the invention.

In the drawings:—

Figure 5 shows a modified form of bearing block.

Figure 6 shows another modified form of bearing block.

Figure 7 shows an enlarged front elevation of a modified form of bearing housing or mounting.

Figure 1:
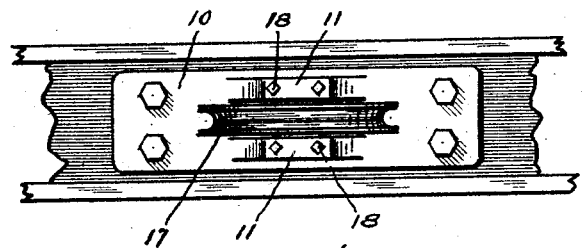
Figure 1 is a top plan view of a sheave block mounted in close proximity between two walls or decks, where it is impossible to have access to either side of the block or housing.

Figure 8 also shows a modified form of block or housing.

Referring to the drawings:—

Figure 2:
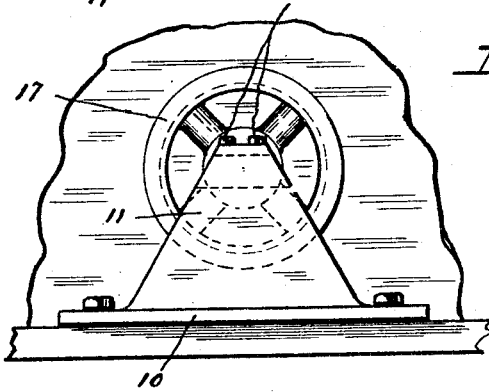
Figure 2 is a side elevation of the same with one wall removed.
Figures 3, 4:
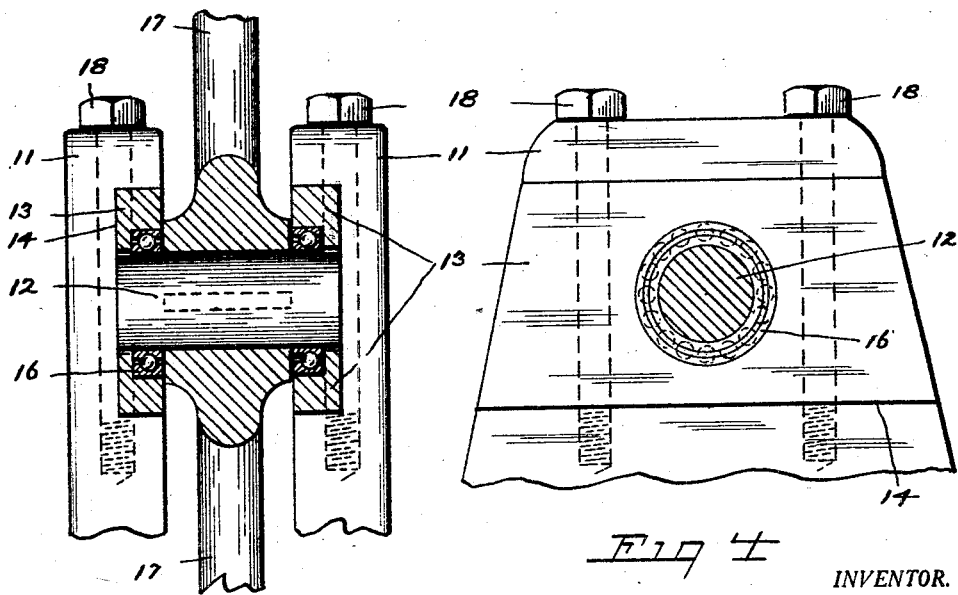
Figure 3 is an enlarged detail sectional view showing the construction of the device.
Figure 4 is a side elevation of the same, taken on the line A—A of Figure 3.

In Figures 1, 2, 3 and 4, the usual form of housing or block 10 is shown which comprises a casting formed with an attaching base and two parallel uprights 11, but in place of said uprights being formed with alined bearing for the sheave pin or shaft 12, they are provided with removable bearing blocks 13 which are mounted in the uprights in some suitable manner, such as shown in the above figures, which comprises forming the inner sides of the uprights 11 with longitudinal slots 14 within which is mounted a bearing block 13 formed either with a plain bearing or a roller or ball bearing 16, within which the shaft 12 carrying the sheave wheel 17 is mounted.

These bearing blocks 13 may be secured within the slots 14 in any suitable manner, such as the bolts 18 which are threaded into the ends of the uprights 11 and passed through grooves formed in the sides of the bearing blocks 15, thus holding them in place from all side strain or pull by the sheave, but allowing them to be removed by removing said bolts and sliding the bearing blocks 13, bearings 16 and shaft 12 out as one unit, and without access to either side of the housing.

It will thus be seen that by this construction that the shaft 12 may float; that is it does not have to be secured in the sheave wheel 17 as it has no side movement as its ends abut the bottoms of the slots 14 in the uprights.

Now taking the modified form shown in Figure 5, the slots 19 formed in the uprights 11 are slightly tapered from end to end and the bearing blocks 20 are tapered to correspond, so that the housing 10 may be so mounted that the pull on the sheave wheel will tend to tighten the tapered bearing blocks in the housing, and no securing bolts will be required.

Also as shown in Figure 6, while the slots 14 in the uprights 11 may have parallel sides as in Figures 1, 2, 3 and 4, the bearing blocks 21 are formed on one of their ends with a flange or head 22 which engages the side of the upright 11 holding said bearing blocks from removal except in one direction; this construction also not requiring any securing bolt.

Now taking the construction shown in Figures 7 and 8, in many cases the housings are made from sheet metal, which is bent to form attaching flanges 23 and uprights 24 as in Figure 7, or an attaching base 25 and uprights 26 as shown in Figure 8.

As shown in Figure 7, the uprights 24 are bent or formed to provide the channel sections 27 within which the bearing blocks 28 may be secured by the pins 29 passed therethrough and through said channels; and in Figure 8 the uprights 26 may be provided with angle pieces 30 secured thereto by rivets 31, to form supports within which may be secured the bearing blocks 28 by the pins 32.

Or the bearing blocks may be secured in the uprights by any suitable means such as set screws, etc. that are inserted from the ends of the uprights, so that access to the sides of the housing is not required.

Having thus described my invention, what I claim as new and desire to secure by Letters Patent, is:—

A demountable bearing for sheave blocks, comprising in combination with a housing having parallel sides formed with slots in their adjacent faces, of bearing blocks formed with alined bearings and adapted to be mounted within said slots, and retaining means for said blocks comprising bolts engaging both said blocks and the sides of the housing.

In testimony whereof I affix my signature.

SYLVANUS H. H. PARSONS.